United States Patent [19]
Emura et al.

[11] Patent Number: 5,177,638
[45] Date of Patent: Jan. 5, 1993

[54] ZOOM LENS-BARREL

[75] Inventors: Tetsuji Emura, Hachioji; Tohru Horikoshi, Hannou; Kazuhiko Futagawa, Hino, all of Japan

[73] Assignee: Konica Corporation, Tokyo, Japan

[21] Appl. No.: 788,610

[22] Filed: Nov. 6, 1991

[30] Foreign Application Priority Data

Nov. 9, 1990 [JP] Japan ................... 2-305428

[51] Int. Cl.⁵ .............. G02B 15/14; G02B 7/02; G03B 17/02
[52] U.S. Cl. .................. 359/704; 359/819; 359/821; 354/286; 354/288; 354/195.12
[58] Field of Search ............ 359/703, 704, 808, 809, 359/811, 815, 819, 821, 826, 827; 354/286, 195.1, 195.12, 287-288

[56] References Cited

U.S. PATENT DOCUMENTS

| | | | |
|---|---|---|---|
| 2,484,510 | 10/1949 | Hutchison, Jr. | 354/288 |
| 3,259,410 | 7/1966 | Neudecker et al. | 354/288 |
| 3,906,535 | 9/1975 | Takahama et al. | 354/288 |
| 4,993,815 | 2/1991 | Yamazaki et al. | 354/195.12 |
| 5,029,991 | 7/1991 | Kohmo et al. | 359/704 |

FOREIGN PATENT DOCUMENTS 2-20814 1/1990 Japan.

Primary Examiner—Bruce Y. Arnold
Assistant Examiner—James Phan
Attorney, Agent, or Firm—Finnegan, Henderson, Farabow, Garrett and Dunner

[57] ABSTRACT

A main body of a zoom lens barrel, which accommodates a zoom lens system having lens components movable in the direction of the optical axis, is composed of a housing having an opening on one side wall in parallel with the optical axis. At least the movable lens components of the zoom lens system can be assembled in the housing through the opening. The housing, accommodating movable lens components of the zoom lens system, is composed of a single element.

14 Claims, 8 Drawing Sheets

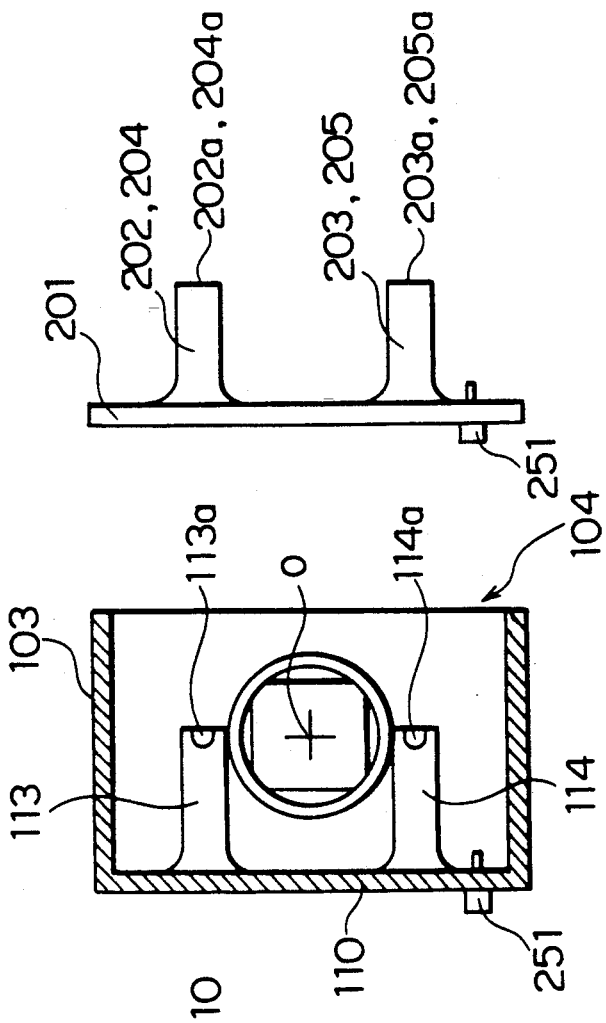

ZOOM LENS-BARREL

BACKGROUND OF THE INVENTION

The present invention relates to improvements in a zoom lens-barrel which may be combined with various types of cameras.

First, referring to FIG. 12, an example of the structure of a conventional zoom lens will be explained.

A zoom lens-barrel 10 of the conventional example is composed as follows. Fixed lens groups comprise the first lens group $L_1$ which is located in the leading position on the photographic object side, and the third lens group $L_3$ which is located in the third position. Movable lens groups comprise the second lens group $L_2$ (referred to as a variator, hereinafter) which is located in the second position, and the fourth lens group $L_4$ (hereinafter referred to as a master lens) which is located in the last position. Zoom lens system Z' provided inside the lens-barrel is composed of the aforementioned lens groups, an automatic iris mechanism, and a drive system.

During variation of magnification, the in-focus state of zoom lens system Z' can be obtained in such a manner that: variator $L_2$ moves on an optical axis along curve A shown in FIG. 13; and master lens $L_4$ moves simultaneously on the optical axis in accordance with a moving diagram which is set between curves $B_1-B_2$ shown in FIG. 13 corresponding to an object distance.

In this case, variator $L_2$ is driven by a zoom motor 51 which will be described later, and the position of variator $L_2$ on the optical axis is detected digitally by an encoder 61. Master lens $L_4$ is driven by a stepping motor 71, and the position of master lens $L_4$ on the optical axis is detected in the form of the number of pulses by a reference position detection device 81.

In order to control the movement of variator $L_2$ and master lens $L_4$, an actual zoom lens drive system is composed in such a manner that: the aforementioned curve A is previously converted into a numerical division of the encoder 61, and the aforementioned curves $B_1-B_2$ are previously converted into a pulse number which is counted from a reference position; the aforementioned dividing number and pulse number are arranged in the form of a map (or a table), and stored in a variable magnification control system so that they can be used for controlling the movement of variator $L_2$ and master lens $L_4$.

On the other hand, a focusing operation is conducted in such a manner that: master lens $L_4$ is wobbled in the direction of the optical axis by an appropriate means; at the same time, a high frequency component is outputted from an image sensor (not shown in the drawing) located on the focal surface side; as illustrated in FIG. 14 which explains the principle, the level variation of this high frequency component is detected so that the front or rear focus can be judged; and master lens $L_4$ is moved to a position in which the peak high frequency component can be obtained.

The zoom lens-barrel 10 which holds the aforementioned 4 lens groups $L_1-L_4$ is composed of a fixed barrel 2 which includes the front half of the lens-barrel, and a mount member 3 which includes the rear half of the lens-barrel.

In this case, a presser ring 4a is installed in the front end of the fixed barrel 2, and the first lens group $L_1$ is directly fixed to the fixed lens-barrel 2 by the presser ring 4a.

On the inner circumferential surface of the fixed lens-barrel 2 between an intermediate wall 2a of the fixed lens-barrel 2 and an E-ring 4b, a cam barrel 11 is provided in such a manner that: it can be rotated around the optical axis; and it can not be moved in the direction of the optical axis.

A cam groove 12 is formed on the inner circumferential surface of the cam barrel 11 so that variator $L_2$ can be moved along a predetermined curve A. In the end of the cam barrel 11, a gear section 13 is formed which is connected with a drive gear 52 of a zoom motor 51.

Inside the cam barrel 11 between an inner circumferential intermediate wall 2a and the E-ring 4b, a zoom guide rail 14 and a rotating motion restricting rail 15 are disposed in parallel to optical axis O.

Variator $L_2$, which is one of the movable lens groups, is supported by a variator holding frame 21.

This variator holding frame 21 is composed in such a manner that: a bush 22 which is installed above the variator holding frame 21, is slidably engaged with a zoom guide rail 14; a U-shaped groove 23 which is formed in the lower position of the variator holding frame 21, is engaged with the rotating motion restricting rail 15; and a cam follower 24 which is formed in the upper portion of the bush 22 is precisely engaged with the aforementioned cam groove 12.

Therefore, when the cam barrel 11 is rotated during the variation of magnification, the variator holding frame 21 (variator $L_2$) is driven by the cam follower 24 which moves along the cam groove 12, and moved in the optical axis direction without being rotated.

Positional information of the variator holding frame 21 on the optical axis, can be detected by an encoder 61 which is connected with a gear section 13 of the cam barrel 11, wherein the positional signal is digitally converted into a rotational number (a rotational angle). In this case, the encoder 61 and the gear section 13 of the cam barrel 11 are connected with each other through appropriate gear trains 62, 63.

On the other hand, the mount member 3 which composes the rear half of the lens-barrel, is fixed to the fixed barrel 2, wherein an iris diaphragm group 92 of an appropriate automatic iris diaphragm 91 is disposed between the mount member 3 and the fixed barrel 2, and the third lens group $L_3$ is directly fixed to the mount member 3. A master lens holding frame 41 can be guided straight along optical axis O when a bush 42 provided below the master lens holding frame 41 is engaged with a master lens guide rail 31 which is installed in parallel with the optical axis between a front wall 3a and a rear wall 3b of the mount member 3.

An engaging rail 43 provided in the upper portion of the master lens holding frame 41 is precisely engaged with a V-shaped groove 34 formed on an upper wall 3c of the mount member 3, so that the rotating motion of the master lens holding member 41 can be prevented.

As described above, the master lens holding frame 41 can be moved in the direction of the optical axis by an appropriate stepping motor 71.

That is, a lead screw 72 formed on the output shaft of the stepping motor 71 is screwed into a nut 73, and a protrusion 73a formed on the outer circumference of the nut 73 is engaged with a groove 33 of a rubber engaging member provided in the master lens holding frame 41, so that the rotation of the nut 73 can be prevented. An arm 44 provided in the master lens holding frame 41 is pushed by a coil spring 35 so that it can be always pressed against the edge surface of the nut 73.

Therefore, when the lead screw 72 is rotated by the stepping motor 71, the nut 73 is moved in the direction of the optical axis, and the arm 44 (the master lens holding frame 41) follows the motion of the nut 73 and moves in the direction of the optical axis.

In this case, the coil spring 35 has the function of eliminating backlash between the lead screw 72 and the nut 73, and the function of eliminating play in the axial direction between the stepping motor 71 and the lead screw 72.

The master lens holding frame 41 is moved under an open loop condition by the numerically controlled stepping motor 71, so that it is necessary to set a reference position. In order to detect the reference position, a reference position detecting device 81 (for example, a photo-interrupter) having an appropriate structure is provided above the upper wall 3c of the mount member 3.

In the aforementioned conventional zoom lens-barrel, there are numerous disadvantages which will be described.

Since the cam barrel 11 is utilized in the conventional lens-barrel, the outer diameter of the fixed barrel 2 is approximately twice as large as the effective diameter of the lens, so that it is difficult to reduce the size of the zoom lens-barrel. The shape of the cam barrel 11 is cylindrical, so that the fixed barrel 2 in which the cam barrel 11 is provided, must be cylindrical, too. In order to house the cam barrel, two parts, the fixed barrel 2 and the mount member 3, are necessary, so that it is difficult to reduce the number of parts.

However, the shape of components (for example, a motor) which compose zoom lens system Z', are not necessarily cylindrical. Consequently, when these components are installed inside the fixed barrel 2, utilization of space inside the fixed barrel 2 is extremely low, which is one of the reasons why the zoom lens can not be made compact.

As illustrated in FIG. 15, in the case of the conventional lens-barrel, various parts such as lens groups $L_1$–$L_4$ composing the zoom lens system must be sequentially assembled in the direction of optical axis O. This assembling work is very complicated. Accordingly, the cost is increased, and further when the assembly of the zoom lens-barrel is automated, it causes serious problems.

Furthermore, in the case of the conventional lens-barrel, high accuracy must be maintained when parts such as a rotary cam, which compose the drive system, are machined. Therefore, it is difficult to reduce the cost.

These problems are common between a zoom lens-barrel and a varifocal lens-barrel in which a plurality of focal distances can be selected, so improvement has been desired for a long time.

SUMMARY OF THE INVENTION

The present invention has been achieved in order to solve the aforementioned conventional problems. It is a primary object of the present invention to provide a zoom lens-barrel, characterized in that: the number of parts composing the zoom lens system is small; the assembly is simple; and high accuracy can be maintained at a low cost when the parts are machined.

In order to accomplish the aforementioned object, the first structure of the present invention is characterized in that: in a zoom lens-barrel, in which the lens-barrel body is provided with a zoom lens system having movable lens groups capable of being moved in the direction of an optical axis, said lens-barrel is composed of a housing, one side wall of which can be opened, and at least said movable lens groups in said zoom lens system can be assembled to the lens-barrel through the opening formed on the side wall.

The second structure of the present invention is characterized in that: a portion of said housing in the first structure which holds an essential portion of said zoom lens system is composed of a single element.

The third structure of the present invention is characterized in that: the movable lens group of said zoom lens system in the first and second structure can be moved along a guide rail parallel with the optical axis.

The fourth structure of the present invention is characterized in that: said zoom lens system in one of the first to the third structure is provided with a lens drive system and an iris mechanism.

The fifth object of the present invention is characterized in that: said housing in one of the first to the fourth structure forms a portion of an outer facing of the camera body.

The sixth structure of the present invention is characterized in that: a cover member which covers said opening of said housing of one of the first to the fifth structure, is a portion of the outer facing of the camera body.

The seventh structure of the present invention is characterized in that: an electrical terminal which can be connected with an external electrical device, is provided in a portion on said housing of one of first to sixth structure or in an appropriate portion of the cover member.

The eighth structure of the present invention is characterized in that: a portion of said housing or an appropriate portion of said cover member of one of the first to the seventh structure, is formed so as to be used for a base plate provided with electronic parts and processing circuits.

The ninth structure of the present invention is characterized in that: said movable lens groups in the third structure can be moved along a common guide rail.

The tenth structure of the present invention is characterized in that: in the third or the ninth structure, fixed lens groups composing said zoom lens system is fixed through said guide rail of the movable lens groups.

The eleventh structure of the present invention is characterized in that: said housing of the ninth structure is provided with a means by which the fixed lens groups held by the guide rail can be positioned.

The twelfth structure of the present invention is characterized in that: in the first structure, the movable lens groups are moved in accordance with a predetermined map in a memory; and said map can be appropriately selected in accordance with an optical positional difference of a leading fixed lens group of the zoom lens system.

The thirteenth structure of the present invention is characterized in that: an image sensor holding section which is provided in the rear portion of said housing in the case of the first structure, is composed of a member different from said housing so that various image sensors can be held in said housing.

The fourteenth structure of the present invention is characterized in that: the iris mechanism of the zoom lens system in the case of the fourth structure is an automatic iris unit which is approximately L-shaped in the direction of the optical axis.

BRIEF DESCRIPTION OF THE DRAWINGS

FIG. 6 is a sectional view taken on line B—B' in FIG. 3;

FIG. 7 is a sectional view taken on line C—C' in FIG. 3;

FIG. 8 is a sectional view of a cover member;

DESCRIPTION OF THE PREFERRED EMBODIMENTS

An embodiment of the present invention will be explained in detail in which the zoom lens-barrel of the present invention is applied to a zoom lens installed in a video camera of AF image pickup system.

Figure 1:
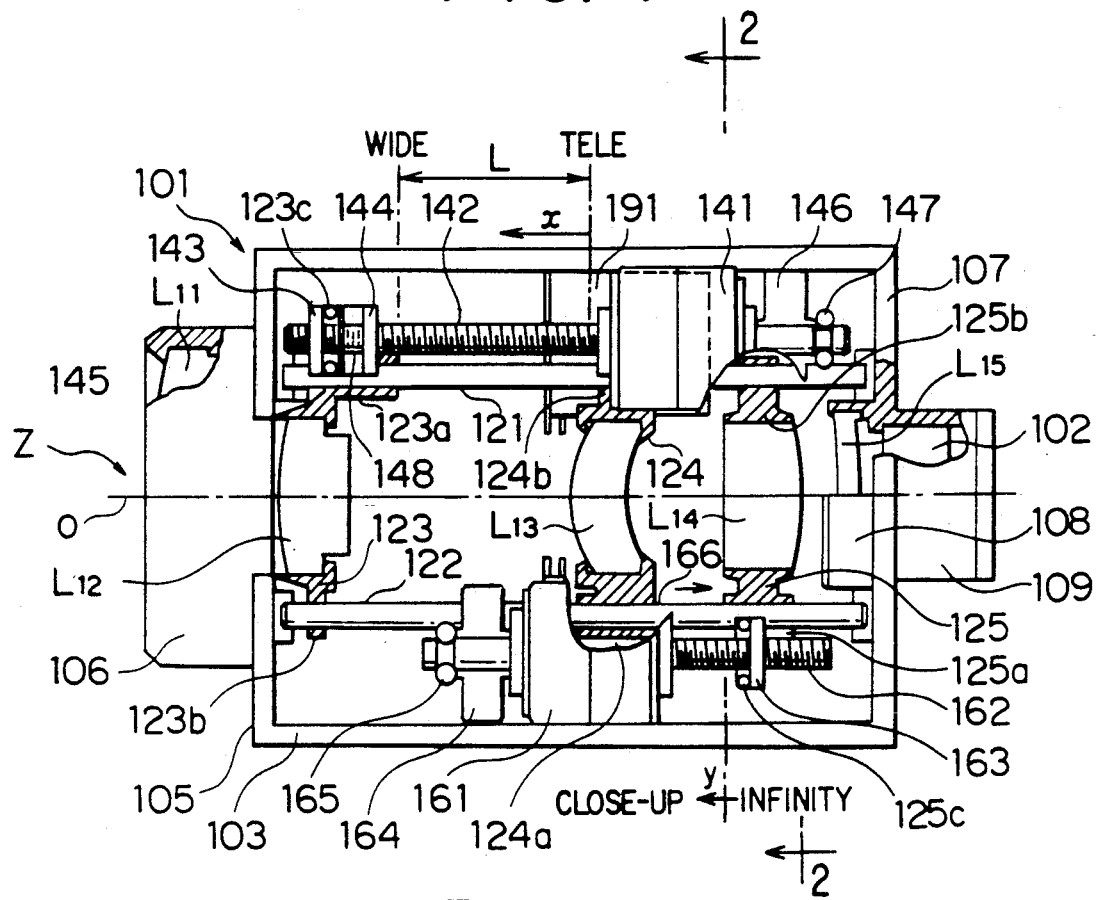
FIG. 1 is a view showing the essential structure of an embodiment of the present invention.

In FIG. 1, zoom lens system Z of a zoom lens-barrel 101 comprises optical systems $L_{11}$, $L_{12}$, $L_{13}$, $L_{14}$, $L_{15}$ composed of five lens groups, one CCD optical member 102, a fixed member which fixes these optical members, or a drive mechanism which drives these optical members, and an iris mechanism. In this case, all members composing zoom lens system Z are provided inside a housing 103 which is a base body.

As illustrated in FIG. 1, in this optical system, the first lens group $L_{11}$ which is located in the leading position on the photographic object side, the third lens group $L_{13}$ which is located in the third position and the fifth lens group which is located in the fifth position, compose a fixed lens group. The second lens group (a variator) which is located in the second position, and the fourth lens group (a master lens) which is located in the fourth position, compose a movable lens group. An optical member 102 which is located in the last position, is provided with an image sensor (CCD) and a quartz plate, and as a whole, it is composed of the CCD optical member, the shape of which is square.

Figure 13:
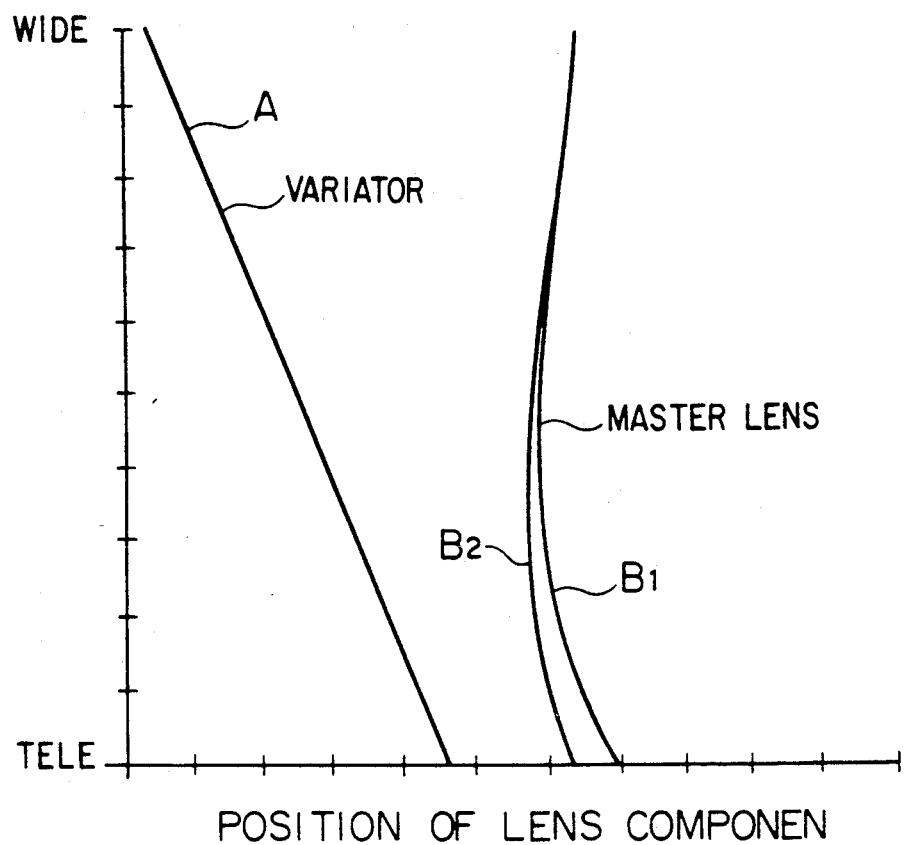
FIG. 13 is a diagram of movement during variation of magnification of a variator and master lens in the conventional type of zoom lens and the zoom lens according to the present invention.

In this case, variator $L_{12}$ which is a front movable lens group is moved on optical axis O in accordance with movement characteristic diagram A shown in FIG. 13, during variation of magnification so that the focal distance of zoom lens system Z can be continuously changed.

On the other hand, when variator $L_{14}$ is moved on the optical axis in accordance with the movement characteristic curves B1-B2 in FIG. 13 synchronously with the movement of variator $L_{12}$, the movement of a focal plane due to variation of magnification is compensated, and at the same time a focusing operation is conducted in accordance with the photographic object distance.

Figure 14:
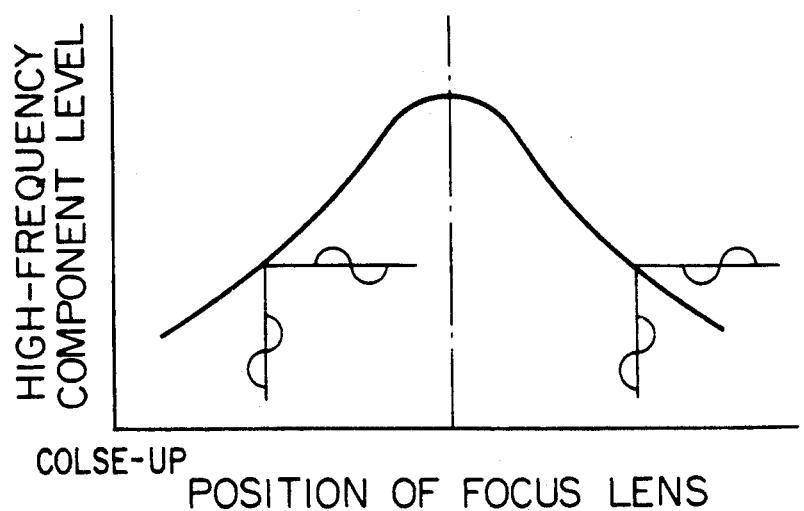
FIG. 14 is a diagram which explains the focusing operations of the conventional type of zoom lens and the zoom lens according to the present invention.
Figure 15:
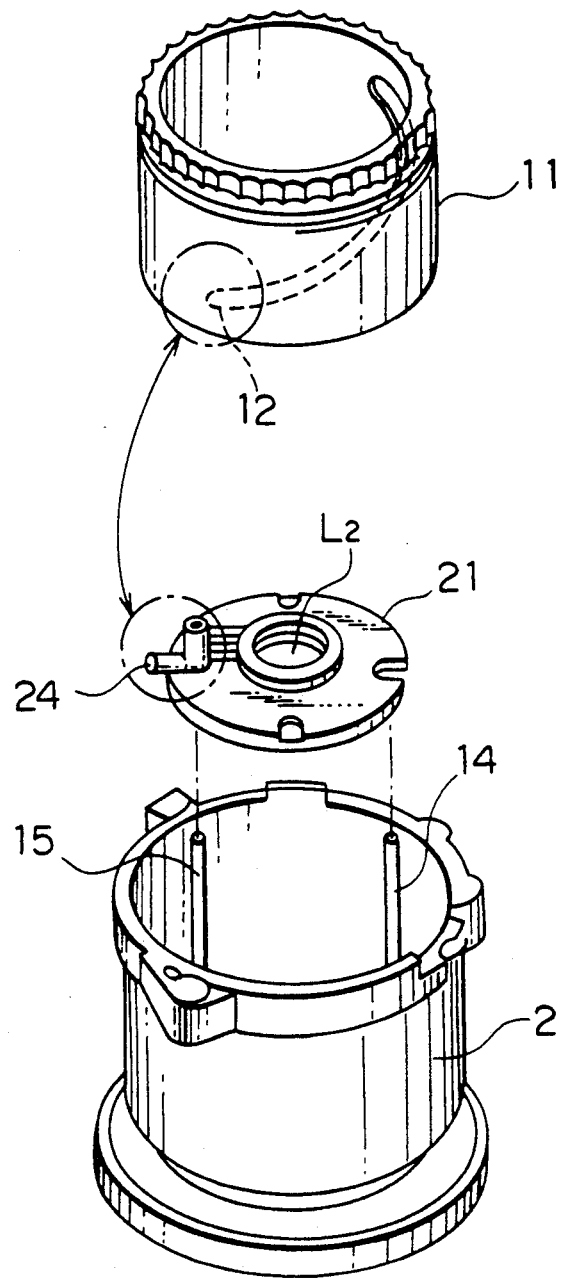
FIG. 15 is a view which shows the assembly work of the cylindrical lens-barrel of the conventional type of zoom lens.

The principle of the focusing operation of master lens $L_{14}$ is the same as that of the focusing operation of a conventional type of zoom lens shown in FIG. 14, so that the explanation will be omitted here.

The CCD optical member 102 is connected with a video signal circuit installed in the zoom lens-barrel 101, a control box provided outside, or a video camera (not shown in the drawing).

These lens groups $L_{11}$-$L_{15}$ and the CCD optical member 102 are installed in the lens-barrel 101. This lens-barrel 101 is composed of a housing 103 which is a base body of the lens-barrel 101, and a cover member 201 which will be described later.

As illustrated in FIG. 3–FIG. 7, the housing 103 is a one-unit body, and provided with 4 surfaces in parallel with optical axis O. In FIG. 1, an opening 104 is formed only on one side wall surface which is in parallel with the surface of the drawing and located on the viewer's side, and the other 3 surfaces are plane walls, the thickness of which is a predetermined value.

A circular frame 106 which holds the first lens group $L_{11}$, is provided outside a front wall 105 which is perpendicular to optical axis O. A circular frame 108 which holds the fifth lens group $L_{15}$ is provided inside a rear wall 107 which is in parallel with the aforementioned front wall 105. A square frame 109 which holds a CCD optical member 102 is provided outside the aforementioned rear wall 107.

In this case, the first lens group $L_{11}$ located outside the housing 103, and the fifth lens group $L_{15}$ are assembled to the lens-barrel in the same manner as conventional technique, which will be described as follows: first, the first lens group $L_{11}$ is set in the frame 106, utilizing gravity; and the fifth lens group $L_{15}$ is set in the frame 108, also utilizing gravity. Then, the lens edge portion is fixed to the frame by means of thermal squeezing.

Figure 3:
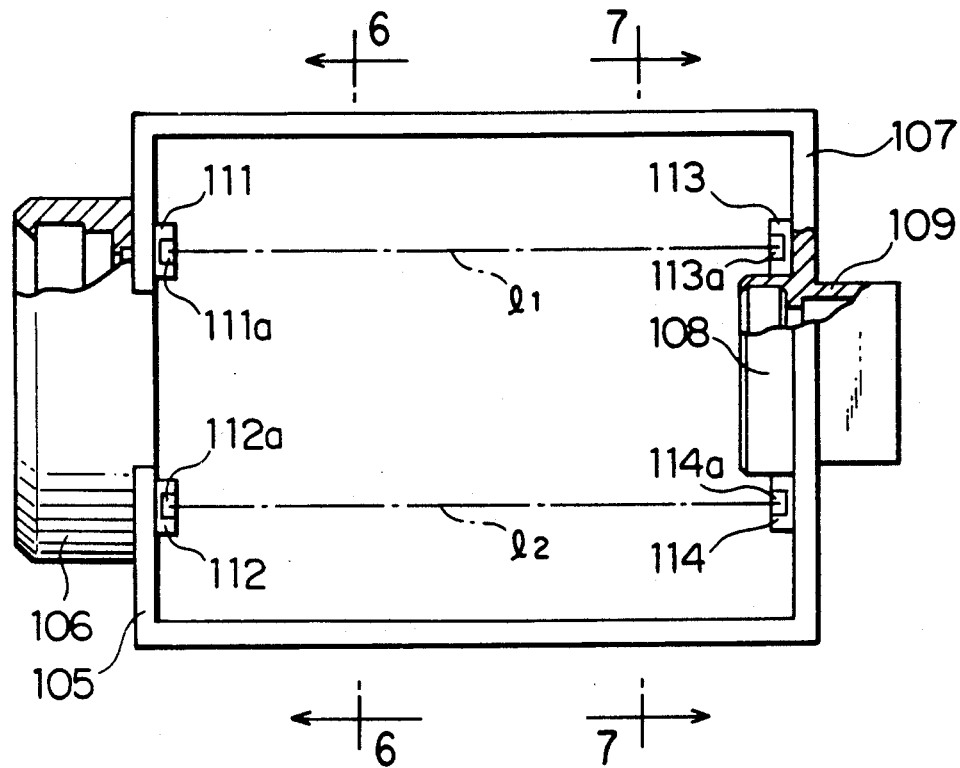
FIG. 3 is a sectional view showing the essential structure of a housing.
Figure 4:
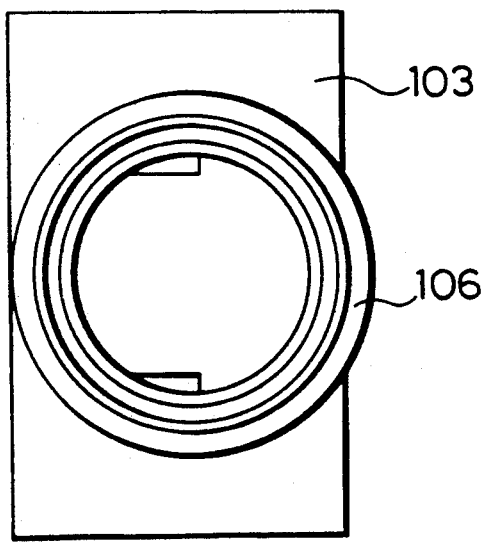
FIG. 4 is a front view taken from the side of a photographic object.
Figure 5:
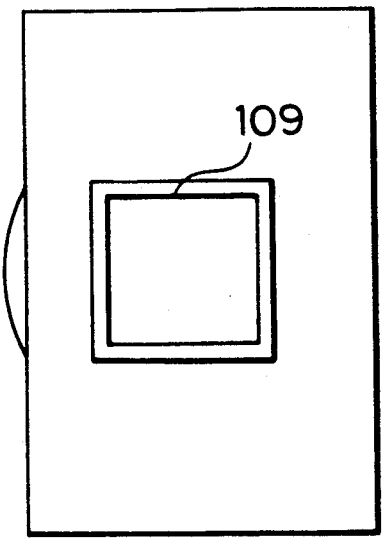
FIG. 5 is a rear view.

As illustrated in FIG. 3, numerals 111-114 are 4 guide rail support portions provided inside the housing 103, and cut-out portions 111a-114a for supporting use are formed in the guide rail support portions. The front guide rail support portions 111, 112 are provided inside the front wall 105 in such a manner that the guide rail support portions 111, 112 oppose to each other with respect to optical axis O. The rear guide rail support portions 113, 114 are provided inside the rear wall 107 in such a manner that the guide rail support portions 113, 114 oppose to each other with respect to optical axis O. The guide rail support portions are rib-shaped.

In this case, a pair of guide rail support portions 111, 113 located on the upper side, are utilized for supporting both ends of an upper guide rail 121 which will be described later. A pair of guide rail support portions 112, 114 are utilized for supporting both ends of a lower guide rail 122.

Therefore, straight line $l_1$ which passes through the centers of upper cut-out portions 111a, 113a, and straight line $l_2$ which passes through the centers of lower cut-out portions 112a, 114a, are parallel with optical axis O.

As illustrated in FIG. 6 and FIG. 7, four cut-out portions 111a, 112a, 113a, 114a are U-shaped in such a manner that each cut-out opening is directed toward the opening 104 of the housing 103.

The upper cut-out portions 111a, 113a are composed in such a manner that they can be cylindrically engaged with both ends of an upper guide rail 121, and the depth of each cut-out portion is actually the same as the diameter of the upper guide rail 121.

The lower cut-out portions 112a, 114a are composed in such a manner that they can be cylindrically engaged with both ends of a lower guide rail 122, and the depth of each cut-out portion is actually the same as the diameter of the lower guide rail In the embodiment explained above, all of the 4 guide rail support portions 111–114 are formed in such a manner that they are protruded from rear walls 110 of the housing 103. However, it should be understood that the guide rail support portions may be a rib-shaped member protruded from the inner side surfaces of the front wall 105 and the rear wall 107, and that the thickness of the member is a predetermined value in a position close to each cut-out portion.

Numeral 121 and numeral 122 are upper and lower guide rail, the sectional shape of which is circular The ends of the upper guide rail 121 are detachably engaged with the cut-out portions 111a, 113a of a pair of upper guide support portions 111, 113, and the ends of the lower guide rail 122 are detachably engaged with the cut-out portions 112a, 114a of a pair of lower guide rail support portions 112, 114.

In FIG. 1, these guide rails 121, 122 are respectively engaged with the cut-out portions 111a–114a so that the guide rails form two rod-shaped guide members which are parallel with optical axis O.

It is possible to set the diameters of the two guide rails 121, 122 to different values. However, it is preferable to use guide rails of the same diameter from the viewpoint of the manufacturing cost and the efficiency of the assembling process.

Numeral 123 is the first movable holding frame which holds variator $L_{12}$ in such a manner that variator $L_{12}$ can be slid along optical axis O. In the upper portion of the first movable frame 123, there is provided a bush 123a which is slidably engaged with the upper guide rail 121, and in the lower portion of the first movable frame 123, there is provided a U-shaped groove 123b which can be slid along the lower guide rail 122, and which is detachably engaged with the lower guide rail 122.

Figure 2:
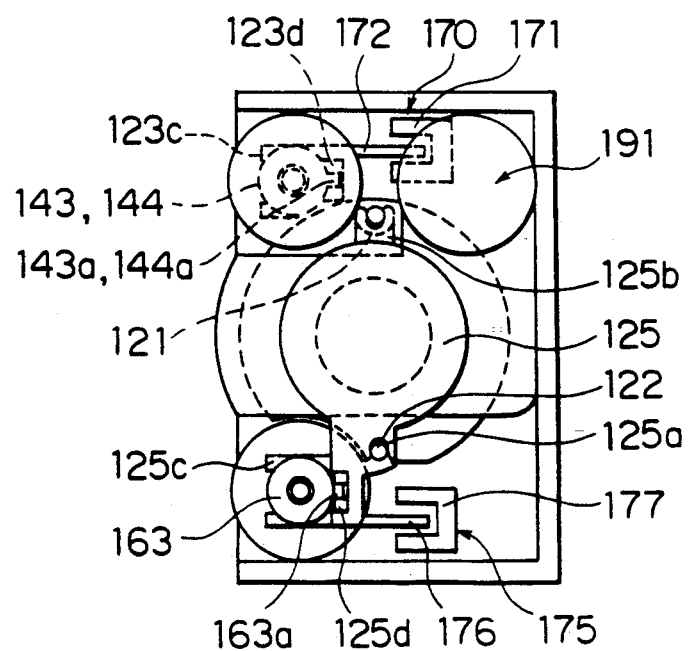
FIG. 2 is a sectional view taken on line A—A' in FIG. 1.

As shown in FIG. 2, the first movable holding frame 123 is provided with a fork-shaped protrusion 123c which is secured by a zoom nut 143 and a washer 145. In a position close to the movable holding frame 123, there is provided a rubber engaging member 123d, in the middle portion of which an appropriate groove is formed.

Numeral 124 is a fixed holding frame which holds the third lens group $L_{13}$. The structure of the fixed holding frame 124 is reverse to that of the aforementioned first movable holding frame 123. In the lower portion, there is provided a bush 124a which is slidably engaged with the lower guide rails 122, and in the upper portion, there is provided a U-shaped groove 124b which can be slid along the upper guide rail 121, and which is detachably engaged with the upper guide rail 121.

This fixed holding frame 124 is originally provided in such a manner that it can be moved in the direction of the optical axis, being guided along the upper and lower guide rail 121, 122. However, when the fixed holding frame 124 is assembled into the housing 103, it is fixed to a predetermined position on the optical axis by a fixing means (not shown in the drawing) which is provided in an appropriate position in the housing 103.

Numeral 125 is the second movable holding frame which holds the master lens $L_{14}$ in such a manner that it can be moved along optical axis O. In the same manner as the fixed holding frame 124, in the lower portion of the second movable holding frame 125, there is provided a bush 125a which is slidably engaged with the lower guide rail 122, and in the upper portion, there is provided a U-shaped groove 125b which can be slid along the upper guide rail 121, and detachably engaged with the upper guide rail 121.

As illustrated in FIG. 2, the second movable holding frame 125 is provided with a fork-shaped protrusion 125c which comes into contact with a nut 163 for AF use described later. In a position close to the second movable holding frame 125, there is provided a rubber engaging member 125d, in the middle portion of which an appropriate groove is formed.

Numeral 141 is a zooming motor which moves the first movable holding frame (variator $L_{12}$) 123 along the optical axis. The motor 141 is inserted into the lens-barrel through the aforementioned opening 104, and then it can be fixed onto the wall surface of the housing 103, maintaining the posture.

In the embodiment shown in the drawing, a stepping motor (for example, a PM type of stepping motor) is used for the zooming motor 141, and operated by means of open loop control.

It is easy to conduct digital control with the stepping motor, and its power factor is high so that the stepping motor is suitable to move a movable lens group at a constant speed.

Numeral 142 is a lead screw which is fixed to the output shaft of the motor 141, and it is possible to form the lead screw integrally with the output shaft.

Numerals 143 and 144 are zooming nuts which are screwed to the lead screw 142, and the nuts 143, 144 are respectively provided with protrusions 133a, 144a which can be engaged with a groove formed on the rubber engaging member 123d of the first movable holding frame 123 so that the nuts 143, 144 can not be rotated together with the zooming lead screw 142 when it is rotated.

Numeral 145 is a washer which holds the fork-shaped protrusion 123c of the first movable holding frame 123 together with the zooming nut 143.

Numeral 146 is the first flywheel to eliminate a transient phenomenon of the zooming motor 141. The first flywheel 146 is fixed onto the rear output shaft of the zooming motor 141, and smooths a sharp variation in rotation caused by the motor 141 so that the occurrence of vibration and noise can be restricted. Numeral 147 is an O-ring which regulates the position of the rear output shaft of the first flywheel.

Numeral 148 is the first coil spring which is wound around the zooming lead screw 142 between the washer 145 and the zooming nut 144. The first coil spring 148 pushes the zooming nuts 144, 145 in the spring force direction through the washer 145.

That is, the zooming nut 143 is pushed by the force of the first coil spring 148 through the washer 145 and the first movable holding frame 123 along optical axis O in the direction of the photographic object, so that a backlash existing between the zooming nut 143 and the zooming lead screw 142 can be removed. Accordingly, the first movable holding frame 123 can accurately follow the rotating motion of the zooming motor 141.

In order to eliminate a back-lash existing between the zooming nut 143 and the zooming lead screw 142, a spring system is adopted in which two nuts come onto contact with both ends of the spring 148 as illustrated in the drawing. The reason is as follows:

When a spring system is utilized in the second movable holding frame 125 and the second coil spring 166 is wound around the lower guide rail 122 so that the second movable holding frame 125 can be pushed in one direction, the zoom lens can not be made compact. In the case of the first movable holding frame 123, the movement amount in the direction of an optical axis is large as compared with the second movable holding frame 125, so that the variation in the compression amount of the coil spring becomes large with regard to the coil diameter when the first movable holding frame 123 is moved. The spring load becomes remarkably light in one end (for example, the wide angle photographic end), and the spring load becomes remarkably heavy in the other end (for example, the telephotographic end).

Consequently, if the minimum spring force necessary for zooming operation is set in one end (for example, in the wide angle photographic end), the spring force in the other end (the telephotographic end) becomes excessively high.

In the case where a stepping motor is used for the zooming motor 141, torque 1.5-2 times higher than the aforementioned minimum torque is required so that open loop control can be conducted by this stepping motor. Accordingly, as the spring load is increased in the other end (the telephotographic end) in the manner described above, output power of the stepping motor must be increased, that is, the size of the apparatus becomes large.

On the other hand, in the case of the spring force of the first coil spring 148 shown in the FIG. 1, when the spring force is higher than the weight of a moving body, the object can be accomplished. Further, even when the first movable holding frame 123 is moved, the load is not varied at all. Accordingly, when the capacity of the drive motor is determined, it is sufficient that the motor generates the torque which is determined in such a manner that the necessary minimum load is multiplied by a safety factor.

The first coil spring 148 can not eliminate play of the zooming lead screw 142 with regard to the zooming motor 141 in the axial direction. When this kind of play needs to be eliminated, for example, a prior art which has been disclosed in the official gazette of Japanese Patent Publication Open to Public Inspection 20814/1990, can be utilized to eliminate the play.

Numeral 161 is an AF motor which moves the second movable holding frame (master lens L₁₄) along optical axis O. For example, the AF motor 161 is composed of a PM type of stepping motor. When the AF motor 161 is assembled into the housing 103, it is inserted through the opening 104, and fixed onto the wall surface of the housing 103 in the same posture.

Numeral 162 is an AF lead screw which is fixed to an output shaft. The AF lead screw 162 can be made integrally with the output shaft.

Numeral 163 is an AF nut which is screwed to the lead screw 162. This nut 163 is provided with a protrusion 163a which can be inserted into a groove of the rubber member 125d of the second movable holding frame 125 so that the nut 163 can not be rotated together with the AF lead screw 162 when it is rotated.

Numeral 164 is the second flywheel to eliminate a transient phenomenon of the AF motor 161. Numeral 165 is the second O-ring to restrict a position in the axial direction of the flywheel 164.

Numeral 166 is the second coil spring which pushes the aforementioned second movable holding frame 125 in the direction of an arrow. The second coil spring 166 is wound around the lower guide rail 122 between the fixed holding frame 124 and the second movable holding frame 125.

The second coil spring 166 is provided in order to remove play existing between the AF lead screw 162 and the AF nut 163, and play of the AF lead screw 162 in the axial direction with regard to the AF motor 161.

Due to the action of the second coil spring 166, the second movable holding frame 125 can accurately follow the rotating motion of the AF motor 161.

In this case, the spring force of the second coil spring 166 is determined in such a manner that: the spring force can be higher than the total weight of the parts relating to the second movable holding frame 125 and of the parts including the AF lead screw 162, so that the device can function without any relation to the posture of the zoom lens-barrel 101.

Positional controls in the direction of an optical axis of the first movable holding frame 123 and that of the second movable holding frame 125, are conducted by means of open loop control of the zooming motor 141 and the AF motor 161. In this case, when the motors are started, the first movable holding frame 123 and the second movable holding frame 125 are moved to a reference position so that a reference signal can be detected. After that, the position of the holding frame 123 and that of the holding frame 125 are set according to the number of pulses counted on the basis of the reference position. Consequently, it is necessary to provide a detection means in order to detect the reference position.

Therefore, in this embodiment, there are provided a zooming photoelectric position detecting means 170 for the first movable holding frame 123, and an AF photoelectric position detecting means 175 for the second movable holding frame 125, as the aforementioned reference position detecting means.

The zooming photoelectric position detecting means 170 is composed of a photo-interrupter 171 fixed in an appropriate position in the housing 103, a shading plate section 172 mounted on the first movable holding frame 123, and a detection circuit not illustrated in the drawing. As described later, the structure of the photo-interrupter 171 has been widely known.

That is, as illustrated in the upper portion of FIG. 2, the body of the photo-interrupter 171 is composed of a C-shaped member having an adequate length in the direction of an optical axis (the direction vertical to the surface of the drawing).

In the cut-out portion of the C-shaped member, there is disposed a necessary number of projectors and receptors which detect the position of the first movable holding frame 123 photoelectrically, and the aforementioned projectors and receptors function as a photoelectric detection optical path section of the photointerrupter 171.

The shading plate section 172 is mounted on the first movable holding frame 123 in such a manner that the shading plate section 172 is protruded into the photoelectric detection optical path section of the photointerrupter 171 so that the shading plate section 172 can interrupt the projector-receptor section of the photoelectric detection optical path section when the first movable holding frame 123 is moved along the optical path.

As a result, when the first movable holding frame 123 is moved along the optical axis, the detection circuit detects the position of the projector-receptor which has been interrupted by the shading plate section 172, so that the position of the first movable holding frame 123 in the direction of the optical axis can be detected at this moment.

On the other hand, an AF photoelectric position detecting means 175 is composed in the same manner as the zooming photoelectric position detecting means 170.

As illustrated in the lower portion of FIG. 2, this AF photoelectric position detecting means 175 is composed of a photo-interrupter 177 fixed in an appropriate position in the housing 103, a shading plate section 176 mounted on the second movable holding frame 125, and a detection circuit not illustrated in the drawing. Further, when the second movable holding frame 125 is moved along the optical path, the shading plate section 176 can interrupt the projector-receptor section formed in the photo-interrupter 177.

The detection circuit detects the position of the projector-receptor section which has been interrupted by the shading plate section 176 so that the position of the second movable holding frame 125 in the direction of the optical axis can be detected.

Numeral 191 is an automatic iris unit composing the iris device of the zooming lens 101.

In the zoom lens-barrel 101 of the present invention, movement of variator $L_{12}$ (the first movable holding frame 123) during variation of magnification, and movement of master lens $L_{14}$ (the second movable holding frame 125) during compensation for focus caused by zooming and during focusing, are conducted by means of open loop control of the zooming motor 141 and the AF motor 161, and further the setting of these movement positions is conducted according to the result of the detection performed by the zooming photoelectric position detecting means 170 and the AF photoelectric position detecting means 175.

The above-described control means is operated as follows: for example, the two motors 141, 161, the two photoelectric position detecting means 170, 175, and the automatic iris unit 191 are controlled by a small CPU (not shown in the drawing) so that the movable lens groups can be moved while a desired characteristic is realized. In the memory of the aforementioned CPU, data which commands movement diagram A of variator $L_{12}$ during variation of magnification and movement diagram B during compensation for focus caused by zooming and during a focusing operation, is stored in the form of a map (or in the form of a table).

This control means can be installed in an optional position such as a position inside the housing 103 of the zoom lens-barrel 101, a position inside the external control box and a position inside a video camera.

As illustrated in FIG. 8, numeral 201 is a cover member to close the opening 104 of the housing 103. The size and shape of the outer peripheral portion is the same as that of the housing 103, and the cover member 201 is detachably provided to the opening 104 of the housing 103 by an appropriate means.

In order to provide a humidity-tight or watertight structure of zoom lens-barrel 101, a rubber packing may be provided on a surface through which the cover member 201 and the housing 103 are set.

Numerals 202-205 are 4 rib-shaped protrusions formed inside the cover member 201, and the positions of the protrusions 202-205 correspond to the positions of the aforementioned guide rail support portions 111-114.

Height of the upper protrusions 202, 204 is determined so that edge faces 202a, 204a of the protrusions can agree with the edge faces of the guide rail support portions 111, 113 under the condition that the cover member 201 is set to the opening 104 of the housing 103. Height of the lower protrusions 203, 205 is determined so that edge faces 203a, 205a of the protrusions can agree with the edge faces of the guide rail support portions 112, 114.

Therefore, when the cover member 201 is set to the opening 104, the upper guide rail 121 is supported by the cut-out portions 111a, 113a of the guide rail support portions 111, 113, and the edge faces 202a, 204a of the protrusions 202, 204 in such a manner that the upper guide rail 121 is pinched by the cut-out portions 111a, 113a and the edge faces 202a, 204a.

In the same manner described above, the lower guide rail 122 is supported by the cut-out portions 112a, 114a of the guide rail support portions 112, 114, and the edge faces 203a, 205a of the protrusions 203, 205 in such a manner that the guide rail 122 is pinched by the cut-out portions 112a, 114a and the edge faces 203a, 205a.

When the engagement of the two guide rails 121, 122 with the cut-out portions 111a–114a of the guide rail support portions 111–114 are tightly fitted, and further when the engaging portion is fixed by an appropriate adhesive agent so that the engagement can not be disconnected even when a shock is given from the outside, these protrusions 202-205 may be omitted, and the shape of the cover member 201 can be made a simple plane member.

Numeral 251 is an electrical communicating terminal means which is provided on an appropriate position on a rear wall 110 of the housing 103 or on an appropriate position on a cover member 201. The aforementioned terminal means 251 is composed in such a manner that it can connect an electrical member such as a CCD optical member 102 provided inside the housing 103, the two photoelectric position detecting means 170, 175, the automatic iris unit 191 and the AF range finding means, with a control box provided outside, or for example, with a video camera.

The lens-barrel composed in the manner shown in the drawings, is assembled as follows.

First, preparation of the units to be assembled into the housing 103 (the lens-barrel body), which is a base body of the zoom lens-barrel, is started.

Three holding frame units which are assembled through the opening 104 of the housing 103 (the lens-barrel) will be explained first.

The rubber engaging members 123d, 125d are mounted on the fork-shaped protrusions 123c, 125c of the first and second movable holding frames 123, 125.

After that, variator $L_{12}$, the third lens group $L_{13}$, master lens $L_{14}$ are inserted into the first movable holding frame 123, the fixed holding frame 124, and the second movable holding frame 125 with the help of gravity, and then they are fixed.

After the three holding frames 123, 124, 125 have been assembled in the manner described above, they are further assembled with the upper and lower guide pin 121, 122. That is, the bush 123a which is formed integrally with the first movable holding frame 123, is engaged with the upper guide rail 121, and the U-shaped groove 123b which is directed downward, is engaged with the lower guide rail 122.

In the same manner, the bush 124a and bush 125a which are respectively formed integrally with the fixed holding frame 124 and the second movable holding frame 125, are respectively engaged with the lower guide rail 122, and both U-shaped grooves 124b, 125b which are directed upward, are respectively engaged with the upper guide rail 121. At this time, the coil spring 166 is provided around the guide rail 122 between the bushes 124a and 125a.

Next, the assembly of the zooming motor unit and AF motor unit will be explained as follows.

First, the first flywheel 146 and the first O-ring 147 are mounted on the rear output shaft of the zooming motor 141, and then two zooming nuts 143, 144, the washer 145, and the first coil spring 148 are mounted in the leading region of the zooming lead screw 142.

In the same manner described above, the second flywheel 164 and the second O-ring 165 are mounted on the rear output shaft of the AF motor 161, and then the AF nut 163 is mounted in the intermediate region of the AF lead screw 162.

After the aforementioned preparation has been completed, the first lens group $L_{11}$ is assembled into a circular frame portion 107 formed on the front wall 105 of the housing 103, and the fifth lens group $L_{15}$ is assembled into a circular frame portion 108 formed on the rear wall 107, and further the CCD optical member 102 is assembled into a square frame portion 109.

In a conventional example, the fixed lens group on the photographic object side can be minutely moved in the direction of the optical axis in the process of assembly in order to adjust the optical variation which occurs in the manufacturing process. However, the aforementioned conventional structure is disadvantageous in that: machining accuracy must be highly improved; and it takes a long period of time to adjust in the process of assembly. In order to solve the aforementioned conventional problem, in this embodiment, the leading fixed lens group $L_{11}$ is fixed to a predetermined position of the housing 103, and the aforementioned optical variation is corrected by an operation contained in the software. That is, in accordance with the variation caused by the fixed lens group $L_{11}$, the aforementioned map in the memory of the CPU which controls the movement characteristic of master lens $L_{14}$, is appropriately selected, so that the same optical condition as that in which the fixed lens group is moved minutely in the direction of the optical axis, can be realized. Therefore, lens group $L_{11}$ can be easily mounted.

In this embodiment, not only the lens system but also the CCD holding frame is formed integrally with the housing so that the number of parts can be reduced. The CCD holding frame may be formed separately from the housing 103 so that various CCDs or image sensors can be selected.

After that, the photointerrupters 171 and 176 of the zooming photoelectric position detecting means 170 and the AF photoelectric position detecting means 175, are inserted through the opening 104 of the housing 103, and fixed in respectively predetermined positions.

Next, the upper guide rail 121 and the lower guide rail 122 on which the three holding frame units 123-125 are mounted, are inserted into the housing 103 through the opening 104, and engaged with the cut-out portions 111a, 112a, 113a, 114a of two pairs of guide rail support portions 111, 113 and 112, 114.

In this case, the fixed holding frame 124 is fixed to a predetermined position on the optical axis by a position fixing member (not shown in the drawing) on the housing 103 side. However, the first movable holding frame 123 and the second movable holding frame 125 are assembled in such a manner that they can be moved in the direction of the optical axis, being guided by the upper guide rail 121 and the lower guide rail 122.

After that, the zooming motor 141 unit and the AF motor 161 unit are individually inserted into the housing 103 through the opening 104, and installed in a predetermined position.

In this case, while the fork-shaped protrusion 123c of the first movable holding frame 123 is being pinched between one of the zooming nuts 143 and the washer 145, and while the protrusions 143a, 144a of the two zooming nuts 143, 144 are being engaged with the groove of the rubber engaging member 123d of the fork-shaped protrusion 123c, the first movable holding frame 123 and the zooming motor 141 unit are combined.

On the other hand, in the case of the second movable holding frame 125, while the fork-shaped protrusion 125c is contacted with the AF nut 163, and further while the protrusion 163a of the AF nut 163 is engaged with the groove formed in the rubber engaging member 125d of this fork-shaped protrusion 125c, the second movable holding frame 125 and the AF motor 161 unit are combined.

The shading plate portion 172 on the side of the first movable holding frame 123, and the shading plate portion 177 on the side of the second movable holding frame 125, are placed in a photoelectric detection optical path of the photointerrupters 171, 176 of the photoelectric detecting means 170, 175 so that positional detection can be conducted by the zooming photoelectric positional detection means 170 and the AF photoelectric positional detection means 175.

In general, a drive unit and a dimmer mechanism of the automatic iris unit 191 are disposed in a straight line, the shape of which in the optical axis direction is similar to character "I". However, in this embodiment, the shape of the automatic iris mechanism in the optical axis direction is similar to character "L" so that the iris mechanism can be made compact in order to be installed in the housing 103. This automatic iris unit 191 is assembled to the lens-barrel at an appropriate time in assembly.

After zoom lens system Z has been assembled into the housing 103, an electrical connection is made, and a final lead wire terminal portion is connected with an electrical communicating terminal means 251 provided on a rear wall 110 of the housing 103.

Finally, the cover member 201 is fixed to the opening 104 of the housing 103 with a connection means such as a screw so that all assembly work is completed.

In this case, the edge surfaces 202a, 203a, 204a, 205a of the protrusions 202-205 formed on the cover member 201, come into contact with the guide rail support portions 111-114 so that the upper guide rail 121 and the lower guide rail 122 can not be disconnected from the guide rail support portions.

When the cover member 201 is mounted on the housing 103, an appropriate packing member is provided between the cover member 201 and the opening 104 of the housing 103 so that the lens-barrel can be a water-tight structure or a humidity preventing structure.

Next, an embodiment of a variation of the cover member 201 will be briefly explained as follows.

As described above, in the case where two guide rails 121, 122 are engaged with the guide rail support portions 111-114 with a tight fit, and fixed by an adhesive agent, it is possible to manufacture the cover member 201 in the form of a simple plane-shaped member. When the cover member 201 is composed in the aforementioned manner, it can be utilized in various ways.

Figure 10:
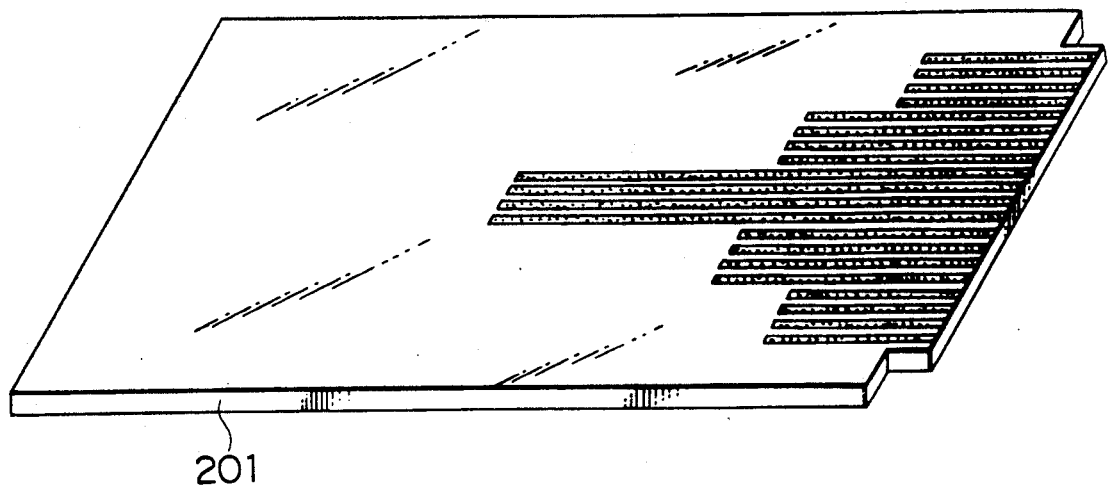
FIG. 10 is a perspective view of a variation in which a cover member is used for a print base plate.

For example, when a terminal pattern (which is a hatched region) shown in FIG. 10 is provided on the upper surface of the cover member 201 so that the cover member 201 can be used as a printed board, and further when all lead wires of electrical parts provided in the housing 103 are intensively connected to the aforementioned terminal pattern, the zoom lens-barrel 101 and a video camera are electrically connected by a one-touch operation in an assembly process in which the zoom lens-barrel 101 is assembled into the video camera.

The same effect can be provided in the case where: the cover member 201 is composed of a plate-shaped member; and a flexible printed board formed as shown in FIG. 10, is adhered onto the outer surface of the cover member 201.

Further, when the cover member 201 is composed in the form of a printed board, an AF circuit or video circuit can be provided on the printed board.

In this case, electrical parts can be provided not only on the outer surface but also on the inside surface, so that the space can be effectively utilized as compared with a conventional cylindrical lens-barrel.

Further, it is also possible to provide this cover member 201 so that it can compose a portion of a video camera.

Figure 11:
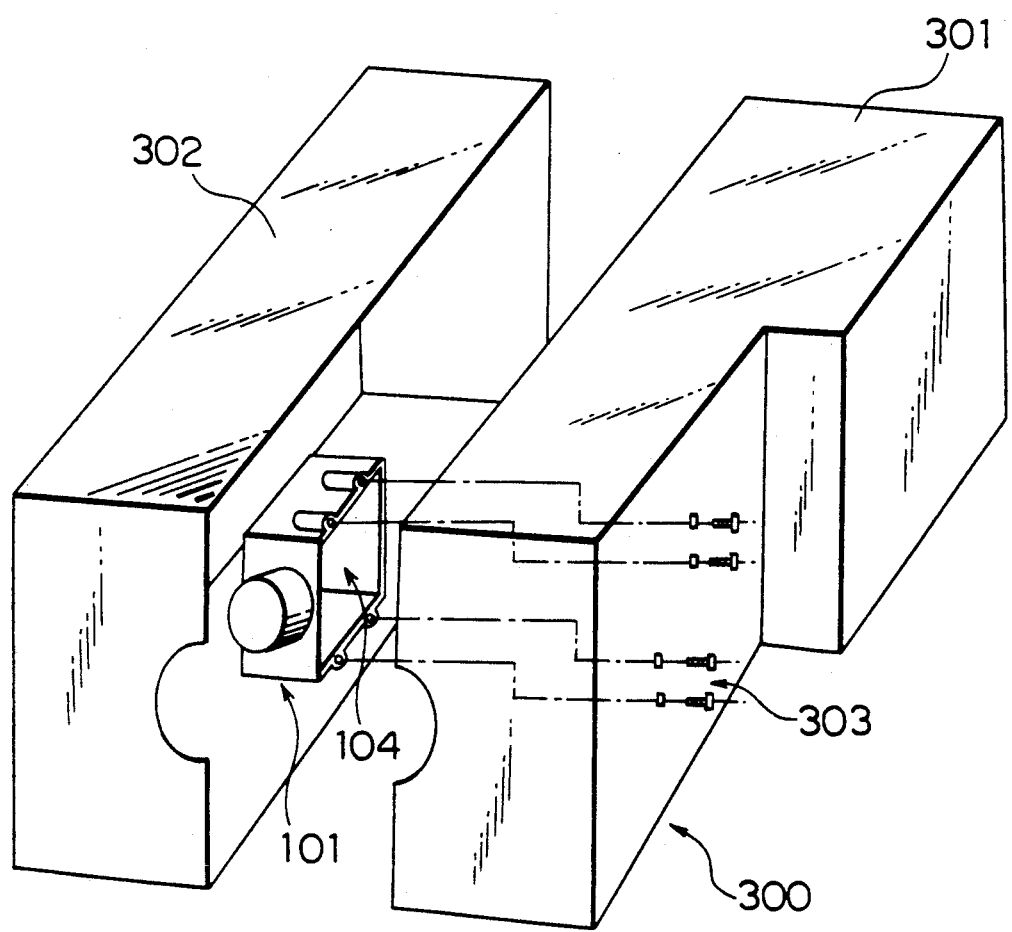
FIG. 11 is a perspective view in the case where a portion of a video camera is utilized for a cover member.
Figure 12:
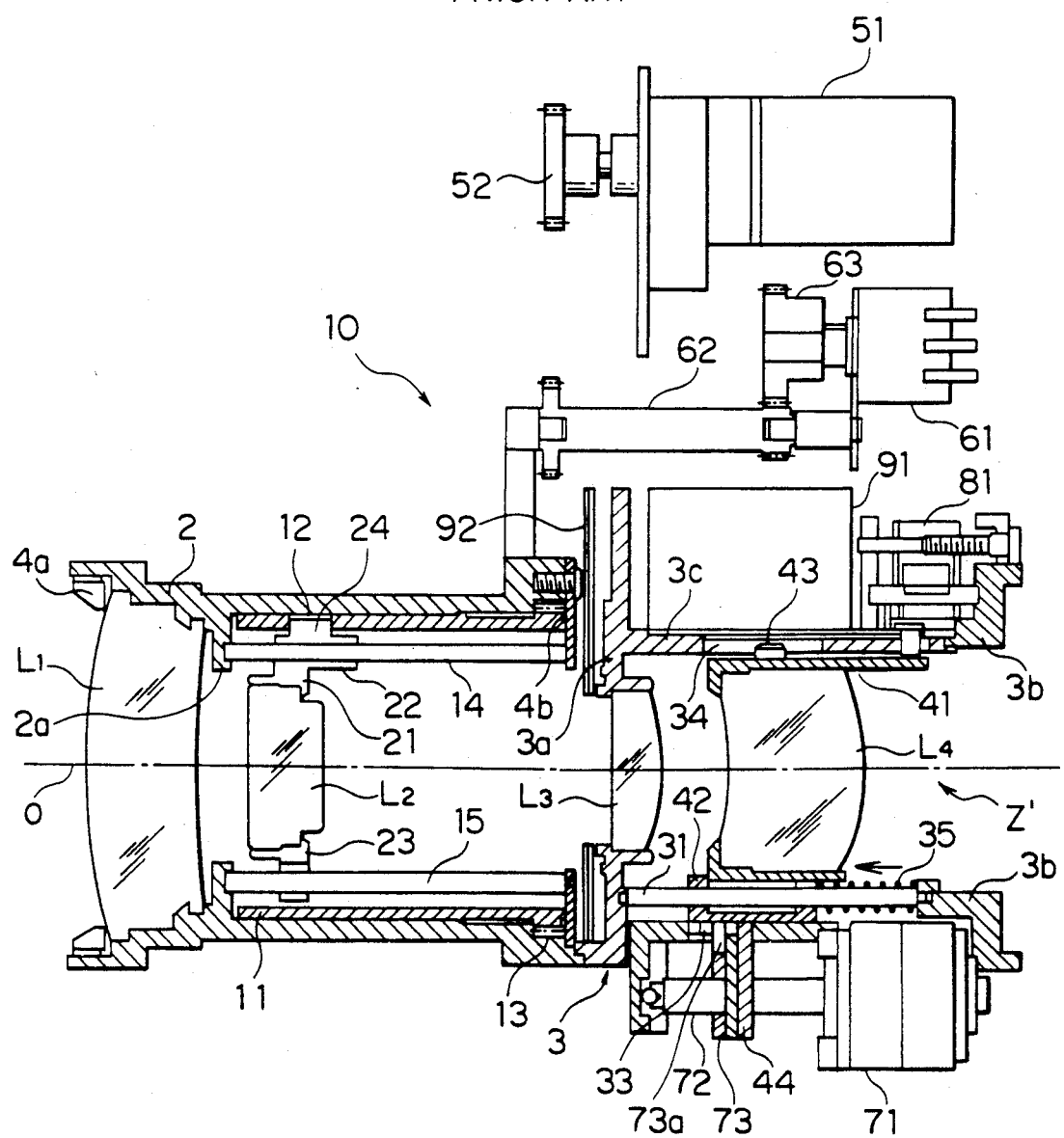
FIG. 12 is a view which explains the structure of a cylindrical lens-barrel used for a conventional type of zoom lens.

For example, as illustrated in FIG. 11, it is possible to compose the video camera in such a manner that: the video camera 300 is divided into two camera portions 301, 302 with regard to a dividing face which includes optical axis O; and the housing 103 in which necessary members are installed, is mounted on the inner face of the camera portion 301 by an appropriate screw means 303.

In the example shown in FIG. 11, the entire lens-barrel is installed inside an external member of the camera. However, a wall portion of the lens-barrel, apart from the cover member 201, may be utilized for the external member of the camera. In this case, various operation switches for photography may be provided on the lens-barrel which forms a portion of the external member of the camera.

An embodiment has been explained above. However, it should be understood that the present invention is not limited to the specific embodiment, and various variations can be carried out within the scope of the present invention. For example, in the above-described embodiment, a video camera of AF photographing system is explained. However, the lens-barrel of the invention can be applied to other types of video camera such as a passive AF system of TCL and an active AF system of IR.

Figure 9:
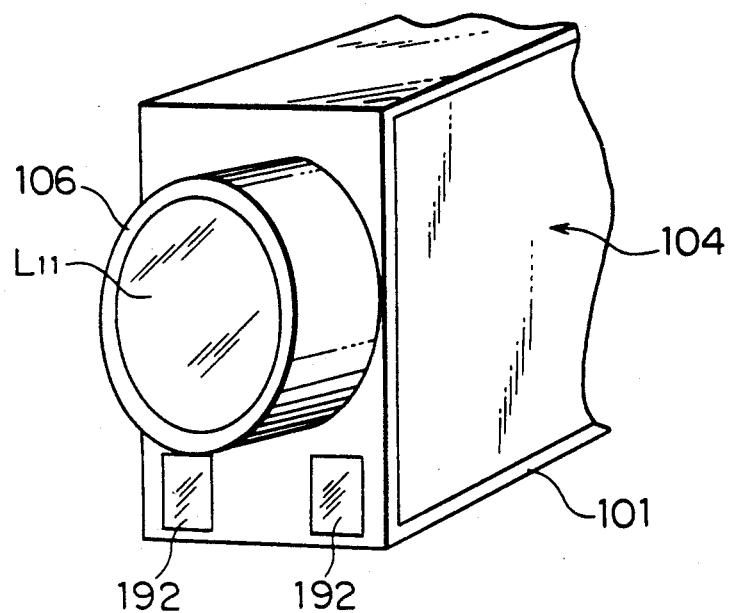
FIG. 9 is a perspective view showing a window portion of a range finding system of an AF range finding means provided on a front wall of the housing shown in FIG. 3.

As illustrated in FIG. 9, an AF optical system 192 may be assembled to an appropriate position in the lens-barrel 101, and the processing circuit may be assembled to the cover member 201.

The present invention can be applied to a conventional camera when CCD optical member 102 is removed from the composition shown in FIG. 1, and emergent light of zooming optical system $L_{11}$–$L_{15}$ is directly focused on the film surface.

In this case, the structure of a zoom lens is the same except the following point: in one case, emergent light from zoom optical system $L_{11}$–$L_{15}$ focuses on CCD optical member 102, and in the other case, emergent light focuses on a film surface.

In the embodiment shown in the drawing, a PM type of stepping motor is used for the zooming motor and AF motor. However, other types of motor may be used as long as it can accurately move one of or both the first and second movable holding frames along the optical axis.

In the embodiment described above, the present invention is applied to a zoom lens. However, the present invention is not limited to the aforementioned case. The present invention can be applied to all varifocal lenses.

According to the first structure of the present invention, the following effects can be provided.

(a) The movable lens groups which are a main composing element of the lens system provided in the housing of the zoom lens-barrel, can be assembled from the opening of the housing, and further these members can be assembled in one direction. Therefore, the assembly process can be greatly simplified, so that assembly time can be shortened and the cost can be reduced. Especially when an automatic assembling method is introduced, the present invention can provide great effect.

(b) When the optically setting position of the lens group of the zoom lens system is adjusted, positions and operating conditions of at least the movable lens group and guide rail can be visually checked. When a malfunction occurs, the cause can be easily found, and each member can be easily adjusted, so that the adjustment conducted in the assembly process can be remarkably simplified.

(c) According to the present invention, the movable lens group can be accurately moved without using a rotary cam barrel, and the cost of parts composing the unit can be reduced, so that a degree of freedom can be extended in the basic design of the zoom lens-barrel.

That is, in the case of a conventional cylindrical type of lens-barrel, a rotary cam barrel, the machining process of which is complicated and the cost of which is high, must be used. In the present invention, the lead screw can be manufactured by means of rolling, so that a highly accurate lead screw of uniform quality can be obtained at a low cost. Accordingly, the unit price of the lens-barrel can be reduced.

According to the second structure of the present invention, the following effects can be provided: machining and assembling process can be simplified; the number of parts can be reduced; and the cost can be reduced.

According to the third structure of the present invention, the zoom lens system can be simply composed by a highly accurate guide rail of low cost which can be easily manufactured, so that assembly work can be simplified and the cost can be reduced.

According to the fourth structure of the present invention, when the zoom lens-barrel of the invention is provided to a camera, the camera can be made extremely light and compact.

According to the fifth structure of the present invention, the number of parts can be reduced and the unit can be made compact.

According to the sixth structure of the present invention, the number of parts can be reduced and the unit can be made compact.

According to the seventh structure of the present invention, the assembly process can be simplified, and the unit can be made compact.

According to the eighth structure of the present invention, the assembly process can be simplified, and the unit can be made compact.

According to the ninth structure of the present invention, the number of parts can be reduced, and assembly process can be simplified.

According to the tenth structure of the present invention, the number of parts can be reduced, and the assembly process can be simplified.

According to the eleventh structure of the present invention, the assembly process can be simplified.

According to the twelfth structure of the present invention, in the manufacturing process of the fixed group, the optical fluctuation can be electrically adjusted without conducting mechanical adjustment, so that adjustment work can be simplified.

According to the thirteenth structure of the present invention, various types of sensor can be utilized.

According to the fourteenth structure of the present invention, the assembly process can be simplified, and the lens-barrel body can be made compact.

As described above, when the present invention is applied, a lens barrel can be provided which is characterized in that: the number of parts is small; assembly is simple; and highly accurate parts of low cost are utilized.

What is claimed is:

1. A zoom lens barrel comprising:
   (a) a zoom lens system including lens components movable in the direction of the optical axis;
   (b) a housing having portions defining an opening on one side wall thereof, through which at least said movable lens components can be assembled in said housing; and
   (c) a main body of said zoom lens barrel being composed of said housing.

2. The zoom lens barrel of claim 1, wherein said housing holding at least said movable lens components of said zoom lens system, is composed of a single element.

3. The zoom lens barrel of claim 1 wherein said movable lens components are movable along a guide disposed in parallel with said optical axis.

4. The zoom lens barrel of claim 3 wherein each of said movable lens components is movable along a common guide.

5. The zoom lens barrel of claim 3 wherein a fixed lens component of said zoom lens system is attached through said guide.

6. The zoom lens barrel of claim 5 wherein means for positioning said fixed lens component held by said guide is provided in said housing.

7. The zoom lens barrel of claim 1 wherein said zoom lens system further comprises a lens drive mechanism and a diaphragm mechanism.

8. The zoom lens barrel of claim 7 wherein said diaphragm mechanism comprises an automatic iris unit which is L-shaped when viewed in the direction of said optical axis.

9. The zoom lens barrel of claim 1 wherein said housing is an external portion of a main body of a camera.

10. The zoom lens barrel of claim 9 wherein a cover covering said opening is said external portion.

11. The zoom lens barrel of claim 1 wherein an electrical terminal which can be connected with a separate electrical device is provided on either said housing or said cover.

12. The zoom lens barrel of claim 1 wherein either said housing or said cover comprises a board provided with an electrical element and a processing circuit.

13. The zoom lens barrel of claim 1 wherein said movable lens component is moved in accordance with predetermined map data stored in a drive control memory, said map data being selectable in response to a deviation of an optical position of the fixed lens component located in the position closest to a photographic object.

14. The zoom lens barrel of claim 1 wherein a casing compound of an element independent of said housing, accommodating an image sensor, is provided in the rear side of said housing.

* * * * *